(12) United States Patent
Schroder

(10) Patent No.: US 8,171,745 B2
(45) Date of Patent: May 8, 2012

(54) COMPARTMENT COOLING LOSS IDENTIFICATION FOR EFFICIENT SYSTEM OPERATION

(75) Inventor: Bruce R. Schroder, Agawam, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 576 days.

(21) Appl. No.: 12/463,451

(22) Filed: May 11, 2009

(65) Prior Publication Data
US 2010/0281892 A1 Nov. 11, 2010

(51) Int. Cl.
F25D 17/06 (2006.01)
F25D 17/02 (2006.01)
(52) U.S. Cl. .................... 62/89; 62/99; 62/434
(58) Field of Classification Search ............... 62/89, 99, 62/259.1, 231, 239, 244, 434, 435
See application file for complete search history.

(56) References Cited

U.S. PATENT DOCUMENTS

| 6,064,121 | A  | 5/2000  | Shervington et al. |
| 6,880,351 | B2 | 4/2005  | Simadiris et al. |
| 6,906,537 | B2 | 6/2005  | Goldberg et al. |
| 7,024,874 | B2 | 4/2006  | Zywiak et al. |
| 7,093,458 | B2 | 8/2006  | Hu |
| 7,137,264 | B2 | 11/2006 | Simadiris et al. |
| 7,231,778 | B2 | 6/2007  | Rigney et al. |
| 7,380,408 | B2 | 6/2008  | Zywiak et al. |
| 7,421,849 | B2 | 9/2008  | Simadiris et al. |

*Primary Examiner* — Chen Wen Jiang
(74) *Attorney, Agent, or Firm* — Carlson, Gaskey & Olds, PC

(57) ABSTRACT

A galley cooling system comprises a plurality of galley cooling units each to be associated with separate galleys. A sensor senses a condition within each of the galleys. A control determines whether a sensed condition is indicative of efficient operation of a particular galley cooling unit, and the control is operable to decrease cooling capacity delivered to a galley cooling unit which is experiencing inefficient operation. An aircraft galley system incorporating the above cooling unit, and a method of operating a galley cooling unit are also disclosed and claimed.

15 Claims, 5 Drawing Sheets

COMPARTMENT COOLING LOSS IDENTIFICATION FOR EFFICIENT SYSTEM OPERATION

BACKGROUND OF THE INVENTION

This application relates to a method and apparatus for determining when one of several galley monuments may have a temperature loss occurring, such that a system control can route cooling capacity accordingly.

Some systems include a plurality of galley monuments for cooling foods. As an example, a large aircraft may have more than six separate galleys, each with a galley monument that includes food carts, small refrigerators, etc. Several of these galley monuments are typically cooled by a single cooling system, which routes a cooling fluid to each of the galley monuments.

The galley monuments may include a work station, stationary cooling components (refrigerators), and docking stations to cool removable food carts. They have doors that may be left open while attendants are working to access food, the carts, etc. When a door is open, there can be cooling loss occurring.

In addition, with time, it is possible a particular galley monument could have a wall become cracked, or may have another reason that its cooling efficiency is lowered.

When any one of the galley monuments in an aircraft, or other system, is experiencing these cooling losses, the ability of the cooling system to cool all of the galley monuments is degraded.

SUMMARY OF THE INVENTION

A galley cooling system comprises a plurality of galley cooling units each to be associated with separate galley monuments. A control determines whether a sensed condition is indicative of efficient operation of a particular galley cooling unit, and the control is operable to decrease cooling capacity delivered to a galley cooling unit which is experiencing inefficient operation. An aircraft galley system incorporating the above cooling unit, and a method of operating a galley cooling unit are also disclosed and claimed.

These and other features of the present invention can be best understood from the following specification and drawings, the following of which is a brief description.

DETAILED DESCRIPTION OF AN EMBODIMENT

Figure 1A:
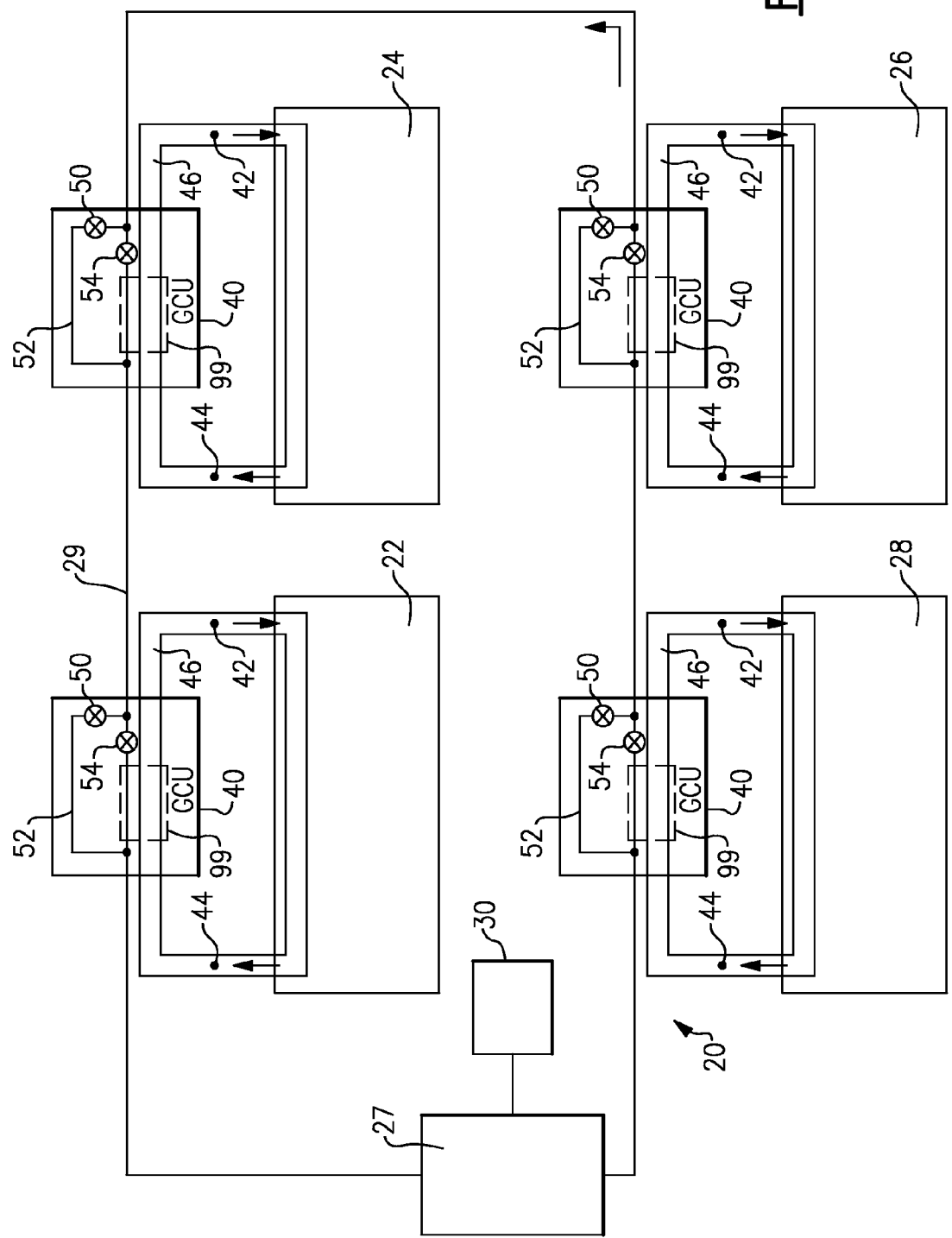
FIG. 1A schematically shows an aircraft galley cooling system.

An aircraft galley system 20 is illustrated in FIG. 1A. As shown, there may be several galley monuments, shown here as 22, 24, 26, and 28. The galley monuments each may include a small refrigerator, a work station, docking for removable food carts, etc. A cooling system includes a control 30 and a cooling system 27 to circulate a cooling fluid through a circuit 29. The circuit is shown as extending to each of the galley monuments 22, 24, 26, and 28 in series, however, in practice the flow may be in parallel.

Each of the galley monuments includes a galley cooling unit 40 through which the cooling fluid in circuit 29 passes. Air is circulated through a passage 46, and is cooled by the cooling fluid in the galley cooling unit 40. This air is then circulated to the galley monument, and into the refrigerator, to components that circulate the cooling air within the removable food carts, and to other destinations within the galley monument that need to be cool.

Within each cooling passage 46 is a temperature supply sensor 42 and a temperature return sensor 44. These sensors provide feedback of the temperature of the air being delivered to the galley monuments 22, 24, 26, and 28, and the temperature returning from the galley monument.

Figure 1B:
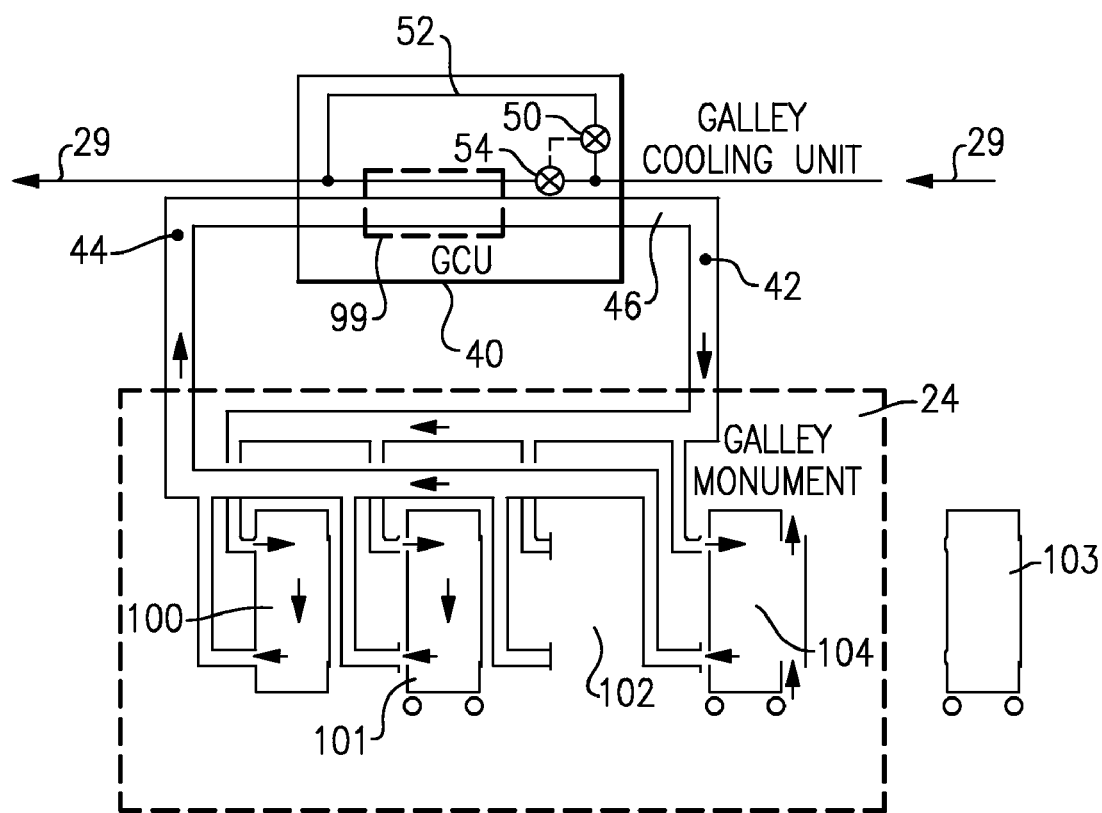
FIG. 1B shows further detail.

FIG. 1B shows a single galley monument 24, and its galley cooling unit 40. As shown, carts 100 may be fully stowed with doors closed. Another cart 102 could be removed and at location 103, while another cart 104 could have an open door. The cart 104 with an open door can result in loss of cooling, as described elsewhere in this application.

Figure 2:
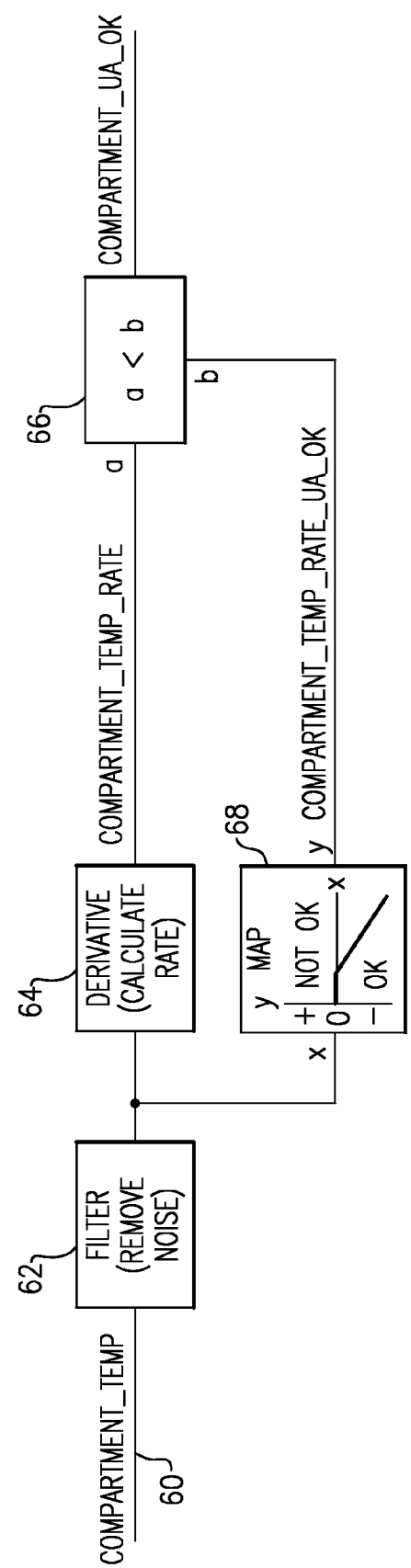
FIG. 2 is a schematic of a determination method for determining a temperature loss.

FIG. 2 shows an algorithm for determining whether there may be a cooling loss at any one galley monument. As shown, a compartment temperature 60 signal, which may be the return temperature from sensor 44, is sent to a filter 62. The filter 62 may be a low pass filter that attenuates high frequency noise on the sensed temperature. This is then sent to a derivative calculator 64. The derivative of the filtered temperature is computed and represents the rate at which the compartment temperature is changing with time. This is then sent to a comparator 66, which determines how the rate of temperature change compares to an expected rate. A map 68 includes an expected rate, and identifies whether a temperature change is or is not as expected at any one moment. As can be appreciated from map 68, essentially, if the rate of change is above an expected rate, then this is determined to be inefficient or undesired operation.

If the derivative is positive at any point, this is also deemed as an unacceptable change, and is indicative of some cooling loss. Further, if the change in temperature is not as expected over a long period of time, an indication may be made that there is some maintenance problem with a particular galley monument and a signal may be sent.

Essentially, the system looks for inefficient cooling at any one of the galley monuments, and determines that some adjustment may be desirable when inefficient operation is identified. While the return temperature is the condition that is monitored in a disclosed embodiment, other conditions that would provide an indication of inefficient operation can also be monitored within the scope of this invention.

Each galley monument is monitored, and the control 30 is provided with an indication of the operation of each galley monument. This is then utilized to determine a proper allocation of cooling load.

Figure 3:
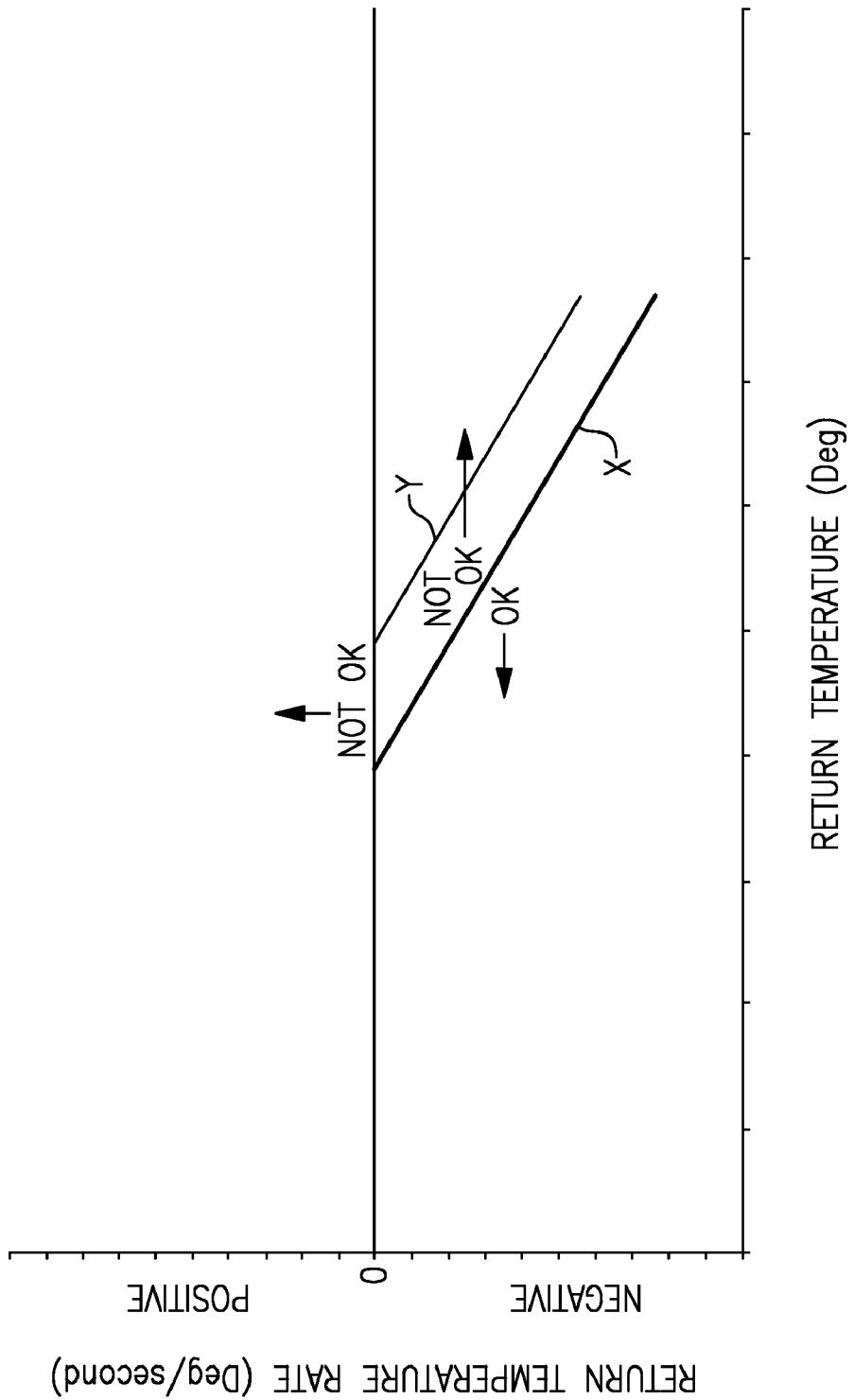
FIG. 3 shows further detail of the FIG. 2 map.

FIG. 3 is a chart showing the derivative changes in the return temperature. A lower slope X is associated with an expected rate change, while an upper slope Y is associated with an actual rate change that could be seen from a cart having an open door. That is, these are the derivatives of the return temperature as expected (X) and as may be actually sensed (Y) from a galley monument having at least one cart with an open door. Of course, the more open doors, the greater the difference between the expected rate and the actual rate.

Figure 4:
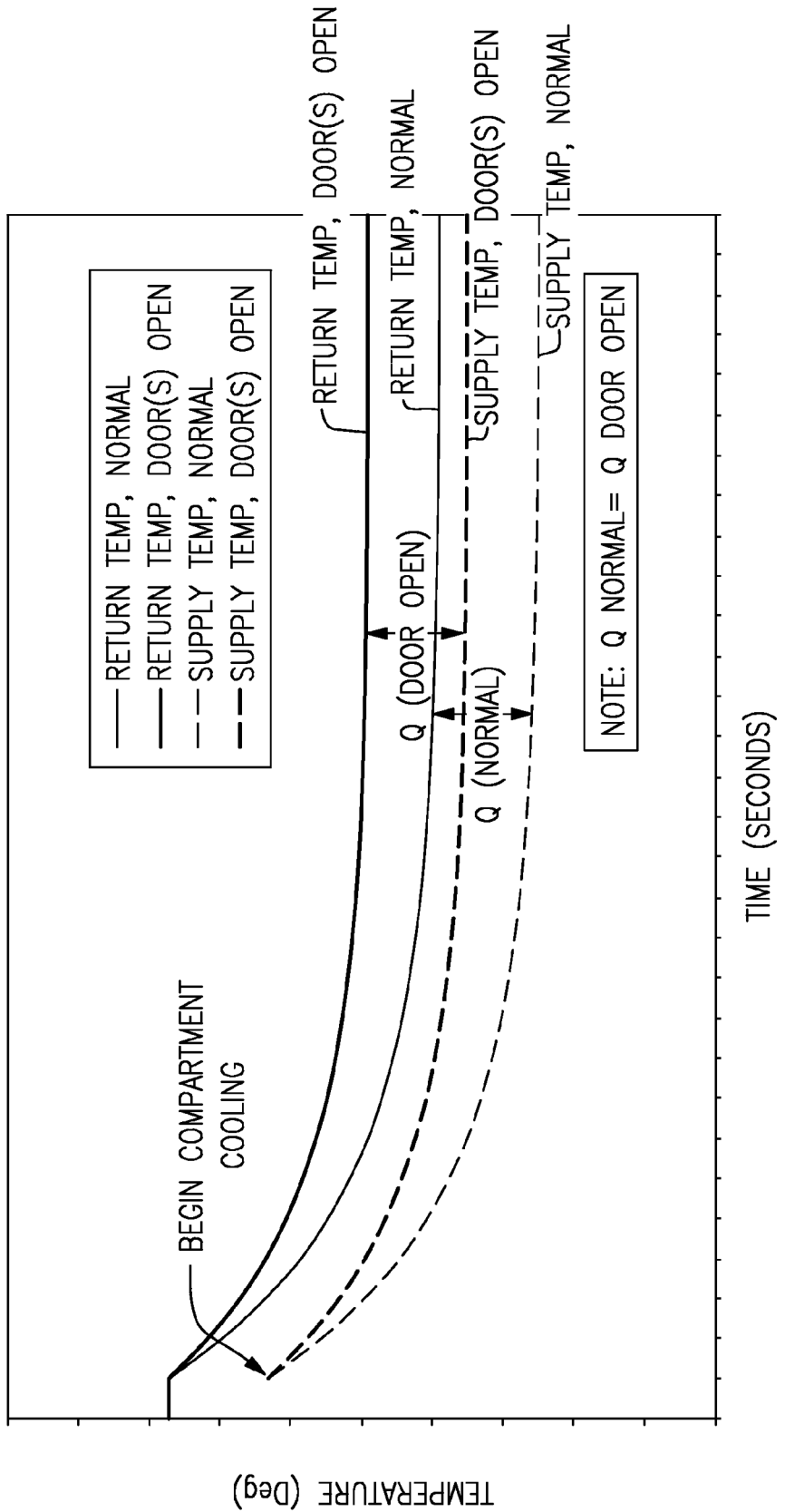
FIG. 4 is a graph of temperature versus time.

FIG. 4 is a graph of supply and return temperatures over time, and shows temperature change for a galley monument with at least one door open, and a galley monument with all doors closed. The difference between the supply temperature and the return temperature is the amount of cooling, Q, that is occurring. As can be appreciated, the door open temperature return is much higher, and indicates a greater amount of cooling load utilized at a particular galley monument. Thus, any one galley monument with an open door can complicate cooling the other galleys.

Returning to FIGS. 1A and 1B, each of the galley cooling units are provided with a heat exchanger 99, a bypass line 52 and valves 50 and 54. The valves 50 and 54 are under the control of the control 30, or a local controller. When it is determined that a particular galley monument is undergoing a cooling loss, such as a door being open, a portion of the cooling fluid in the cooling fluid line 29 may be passed through the bypass line 52 such that it does not pass through the galley cooling unit heat exchanger 99. In this manner, the amount of cooling capacity utilized at the inefficient galley monument is reduced, and there is more cooling capacity available for the other galley monuments. The valves 50 and 54 may modulate the flow of cooling fluid such that only a portion passes through the galley cooling unit heat exchanger 99, or may entirely bypass a particular galley cooling unit heat exchanger 99.

Although one example of a galley monument in an overall aircraft galley system 20 is illustrated, this application would provide benefits in any number of other configurations of galley monuments and aircraft galley systems.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A galley cooling system comprising:
   a plurality of galley cooling units each to be associated with a separate galley monument;
   a sensor for sensing a condition at each of the galley monuments; and
   a control for determining whether a sensed condition is indicative of efficient operation of a particular galley cooling unit, and said control being operable to decrease cooling capacity delivered to a galley cooling unit which is experiencing inefficient operation.

2. The galley cooling system as set forth in claim 1, wherein said sensed condition is a return temperature of air being returned to said galley cooling unit from each of the galley monuments.

3. The galley cooling system as set forth in claim 2, wherein a change in the sensed return temperature is compared to an expected change in the return temperature to determine if sufficient operation is occurring.

4. The galley cooling system as set forth in claim 1, wherein a valve and bypass line selectively bypass a cooling fluid away from a galley cooling unit which has been determined to be experiencing inefficient operation.

5. The galley cooling system as set forth in claim 4, wherein there are a plurality of galley monuments associated with said galley cooling system, and the bypass of cooling fluid around a galley cooling unit which has been determined to be experiencing inefficient operation allowing more cooling capacity for the others of said plurality of galley cooling units.

6. An aircraft galley monument system comprising:
   a plurality of galley monuments, each of said galley monuments being for cooling food; and
   each of said galleys including a galley monument cooling unit, a temperature sensor for sensing a condition from each of said galley monuments, and a control for determining whether a sensed condition is indicative of efficient operation of a particular galley cooling unit, and said control being operable to decrease cooling capacity delivered to a galley cooling unit which is experiencing inefficient operation.

7. The aircraft galley system as set forth in claim 6, wherein said sensed condition is a return temperature of air being returned to said galley cooling unit from each of said galley monuments.

8. The aircraft galley system as set forth in claim 7, wherein a change in the sensed return temperature is compared to an expected change in the return temperature to determine if sufficient operation is occurring.

9. The aircraft galley system as set forth in claim 6, wherein a valve and bypass line selectively bypass a cooling fluid away from a galley cooling unit which has been determined to be experiencing inefficient operation.

10. The aircraft galley system as set forth in claim 9, wherein the bypass of cooling fluid around a galley cooling unit which has been determined to be experiencing inefficient operation allowing more cooling capacity for the others of said plurality of galley cooling units.

11. A method of cooling a galley comprising the steps of:
    (a) supplying a cooling fluid to a galley cooling unit, and cooling air at said galley cooling unit;
    (b) circulating cooled air from said galley cooling unit into a galley;
    (c) sensing a condition at each said galley; and
    (d) determining if a particular galley cooling unit is experiencing inefficient operation, and reducing the amount of cooling capacity provided by the cooling fluid to a galley cooling unit which is determined to be experiencing inefficient operation.

12. The method as set forth in claim 11, wherein the condition that is sensed is a return temperature of air being returned to the galley cooling unit.

13. The method as set forth in claim 12, wherein a rate of change of said return temperature of air is compared to an expected rate of change to determine if sufficient operation is occurring.

14. The method as set forth in claim 11, wherein a valve and bypass line selectively bypass a cooling fluid away from a galley cooling unit which has been determined to be experiencing inefficient operation.

15. The method set forth in claim 14, wherein the bypass of cooling fluid around a galley cooling unit which has been determined to be experiencing inefficient operation allowing more cooling capacity for the others of said plurality of galley cooling units.

* * * * *